United States Patent [19]

Takei

[11] 4,422,101
[45] Dec. 20, 1983

[54] ELECTRONIC CYLINDER MAKING METHOD

[75] Inventor: Masayuki Takei, Ikeda, Japan

[73] Assignee: Toppan Printing Co., Ltd., Tokyo, Japan

[21] Appl. No.: 285,916

[22] Filed: Jul. 23, 1981

[30] Foreign Application Priority Data

Jul. 30, 1980 [JP] Japan .............................. 55-104485
Mar. 9, 1981 [JP] Japan .................................. 56-33649

[51] Int. Cl.³ ............................................ H04M 1/22
[52] U.S. Cl. .................................. 358/299; 358/287; 382/47; 364/469
[58] Field of Search ................. 358/299, 287; 382/47, 382/49, 55; 364/469

[56] References Cited

U.S. PATENT DOCUMENTS

| | | | |
|---|---|---|---|
| 3,582,549 | 6/1971 | Hell | 358/287 |
| 3,770,888 | 11/1973 | De Vos et al. | 358/299 |
| 4,013,829 | 3/1977 | Baar et al. | 358/299 |
| 4,013,831 | 3/1977 | Dolves et al. | 358/299 |
| 4,057,838 | 11/1977 | Doelves et al. | 358/299 |
| 4,163,605 | 8/1979 | Yamada | 358/287 |
| 4,245,260 | 1/1981 | Doelves | 358/299 |
| 4,282,550 | 8/1981 | Coyiello | 358/287 |

*Primary Examiner*—Tommy P. Chin
*Assistant Examiner*—Edward L. Coles

*Attorney, Agent, or Firm*—Bacon & Thomas

[57] ABSTRACT

An electronic cylinder making method and an apparatus for the same, which makes a printing cylinder for an endless and/or a multiple pattern. Even where a difference arises between the density of the front side of the original and that of the backside thereof as well between the density of the right side of the original and that of the left side thereof, the cylinder making method and apparatus of this invention eliminate the appearance of the density difference at the seams of the front side and backside of the respective main patterns and those of the right side and left side thereof when the main patterns are engraved on a printing cylinder. The cylinder making method of the invention includes the steps of forming the original with a main pattern which is extended lengthwise and crosswise by a prescribed length; scanning the original to provide digital density signals; supplying the digital density signals to a computer; gradually converting the signals denoting the densities of the extended backside and right side pattern sections into the signals denoting the densities of the opposite front side and left side pattern sections to the extended pattern sections; and engraving screened patterns on a cylinder in accordance with the contents of signals denoting the corrected densities, thereby producing a printing cylinder which is engraved with patterns whose seams are free from density differences.

12 Claims, 7 Drawing Figures

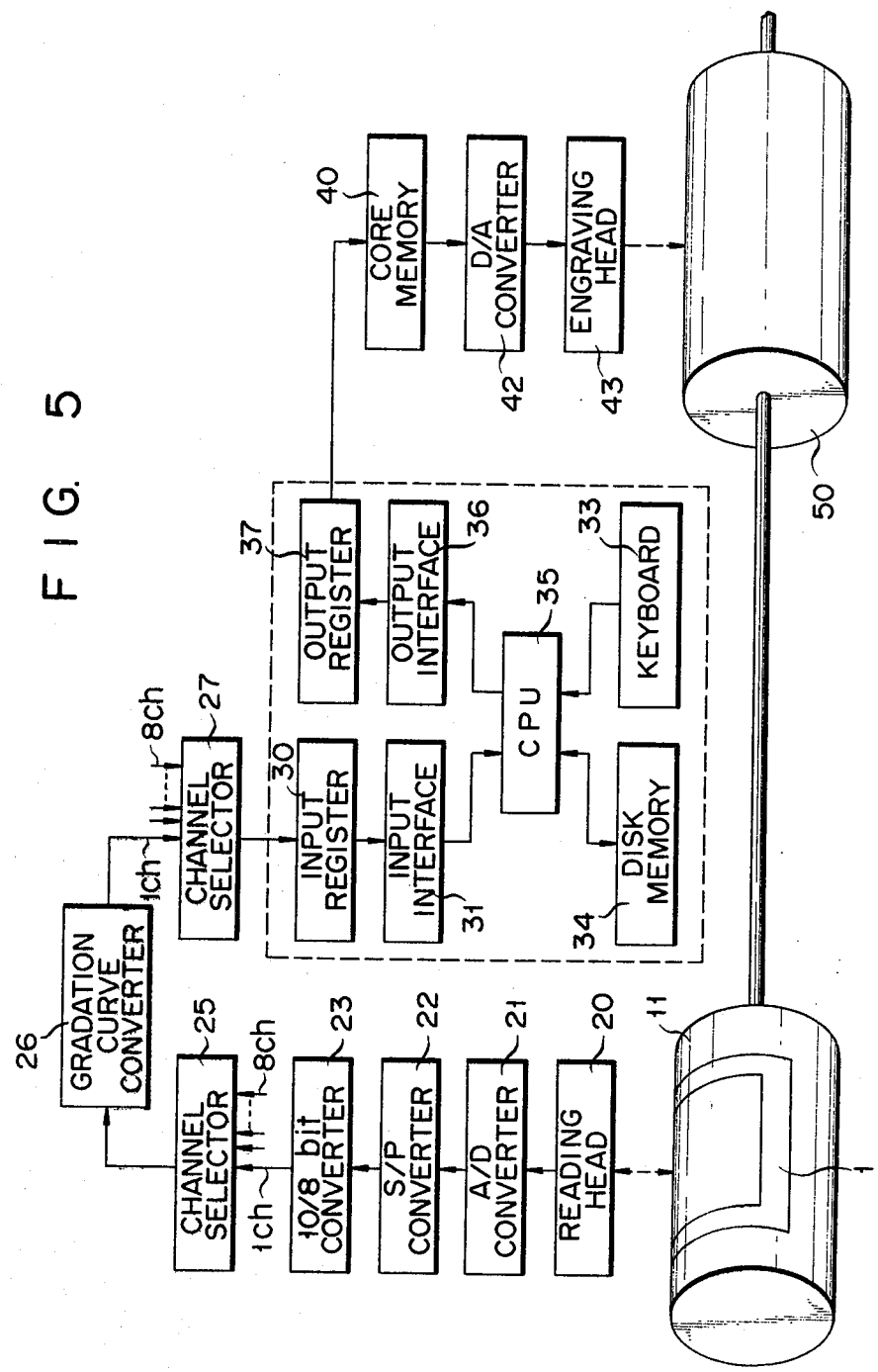

ELECTRONIC CYLINDER MAKING METHOD

BACKGROUND OF THE INVENTION

This invention relates to an electronic cylinder making method by which repetitively arranged same patterns are printed on a printed web.

Patterns printed, for example, on a structural member such as a decorative panel, floor material, wall paper, or printed fabric are mostly of an endless type in which the same patterns are continuously arranged in a given direction, or a multiple type in which the same patterns are repetitively arranged at a certain space, or a composite type in which the same patterns are impressed by a combination of both forms of arrangement. For example, the grain design is produced by the composite arrangement.

The known apparatus for electronically cylinder making the above-mentioned endless and/or multiple pattern includes HELIO-KLISHOGRAPH K-200 electronic cylinder making apparatus manufactured by Dr. Ing. R, Hell GmbH (hereinafter simply referred to as "the HELIO apparatus") set forth in the U.S. Pat. Nos. 4,057,838 and 4,013,831. Where an endless and a multiple pattern is processed by the HELIO apparatus, it is necessary to provide a special form of original which has a continuous pattern on the upper from lower sides, and on the right from left sides, and moreover portions of the pattern on the upper and lower sides are drawn with a same level of density, and portions of the patterns on the right and left sides are drawn with a same level of density. Generally, such original is photographically produced. The original is fitted to the peripheral surface of a reading cylinder. A pattern is engraved on a printing cylinder with a density signal obtained through a reading head. Where, in this case, the lengthwise portion of the original is engraved exactly on one circumference of the printing cylinder, then an endless pattern is processed. Where a pattern impressed on the original is repeatedly engraved in the axial direction of the printing cylinder, then a multiple pattern is processed.

However, considerable difficulties are encountered in preparing an original having a continuous pattern on the upper from lower sides and on the right from left sides, and moreover having the portions of the pattern on the upper and lower sides with a same level of density, and the portions of the pattern on the right and left sides with a same level of density. Even if a difference between the density with which, for example, the pattern appearing on the upper side is drawn and the density with which the pattern appearing on the lower side is drawn is so slight as can not be detected even by a densitometer, the density difference is distinctly indicated at the junction of the respective patterns appearing on an actual printed web. Consequently, failure of cylinder making, that is, failure to prepare an original is often discovered only after trial printing is undertaken from such original. Hitherto, therefore, it has been necessary to make a printing cylinder over again after correcting or remaking an original or a printing cylinder obtained therefrom. In any case, the above-mentioned work consumes a great deal of time and cost.

SUMMARY OF THE INVENTION

It is accordingly the object of this invention to provide an electronic cylinder making method for making a printing cylinder on which an overall pattern consisting of an assembly of the same components is engraved without causing different densities to appear at the seams of the respective component patterns.

To attain the above-mentioned object, this invention provides an electronic cylinder making method which comprises the steps of: scanning an original impression, carrying out photoelectric conversion, and issuing a signal denoting the density of the original impression; and correcting a signal denoting the density of the pattern impressed on one side of the original by a signal denoting the density of the pattern drawn on the opposite side of the original with the rate of the correction varies in accordance with a distance from the edge of the original of the pattern whose density is to be corrected.

BRIEF DESCRIPTION OF THE DRAWINGS

FIG. 5 is a block circuit diagram of the cylinder making apparatus of the invention.

DETAILED DESCRIPTION OF THE PREFERRED EMBODIMENT

This invention is now described with reference to the accompanying drawings indicating the embodiment of the invention. The undermentioned embodiment is an improvement on the aforementioned HELIO apparatus. This improvement is effected by providing a computer capable of carrying out a correction operation while a signal is being processed by the HELIO apparatus at a point upstream of a core memory. Only brief description is given of those portions of the HELIO apparatus which are already known.

The following description chiefly refers to an electronic cylinder making method which carries out correction to eliminate different density values appearing at the lengthwise seams of the respective components of an endless pattern (hereinafter referred to as "longitudinal correction") and also correction to eliminate different density values occurring at the crosswise seams of the spatially arranged components of a multiple pattern (hereinafter referred to as "transverse correction"). However, brief description is only given of the electronic cylinder making method which is capable of carrying out only one of the abovementioned density-correcting processes.

Figure 1:
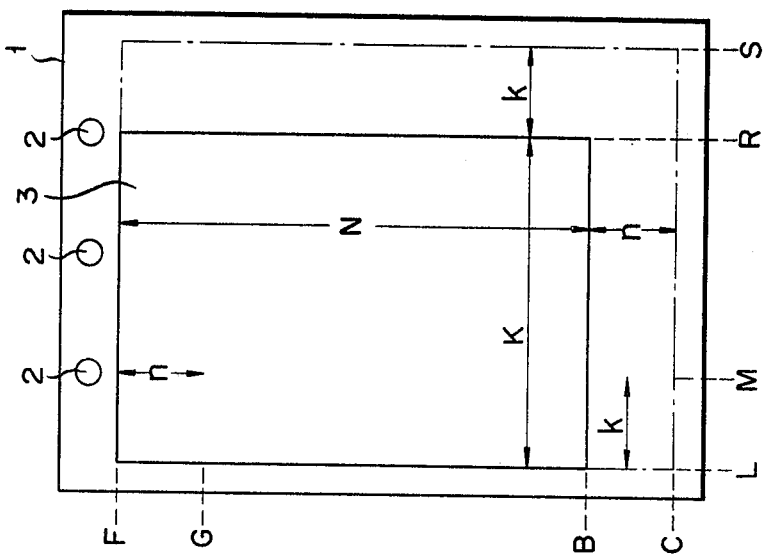
FIG. 1 indicates the arrangement of an original with which an electronic cylinder making apparatus embodying this invention is applied.

FIG. 1 indicates an original 1 applied in making a printing cylinder bearing endless pattern and multiple pattern according to a method embodying this invention. The original 1 is provided with holes 2 by which the original 1 is fitted to a reading cylinder. A pattern section 3 is defined in the original 1. The front side portion F and backside portion B of the pattern section 3 are used to impress continuous, namely, endless pattern on a printing cylinder. The right side portion R and left side portion L of the pattern section 3 are used to engrave spatially arranged multiple pattern on the printing cylinder.

Unlike the conventional original, the backside B of the original is extended, as indicated in a dot-dash line, by a BC section. This extended BC section is intended to carry out the longitudinal density correction and indicates the same pattern as that which is shown in the front side section FG. The width of the extended BC section corresponds to a number n of sampling points (n is defined to be 200 and corresponds to a length of about 3 cm). The right side R of the original is extended, as indicated in a dot-dash line, by an RS section. This extended RS section is intended to carry out the transverse density correction and indicates the same pattern as that which is shown in the left side section LM. The width of the extended RS section corresponds to a number k of scanning lines (k is defined to be 200 and corresponds to a length of about 3 cm).

The original 1 arranged as described above is fitted to the reading cylinder. While the reading cylinder is rotated, the reading head is shifted from the left to the right of the original, thereby producing a signal denoting the density of the original pattern.

Figure 2:
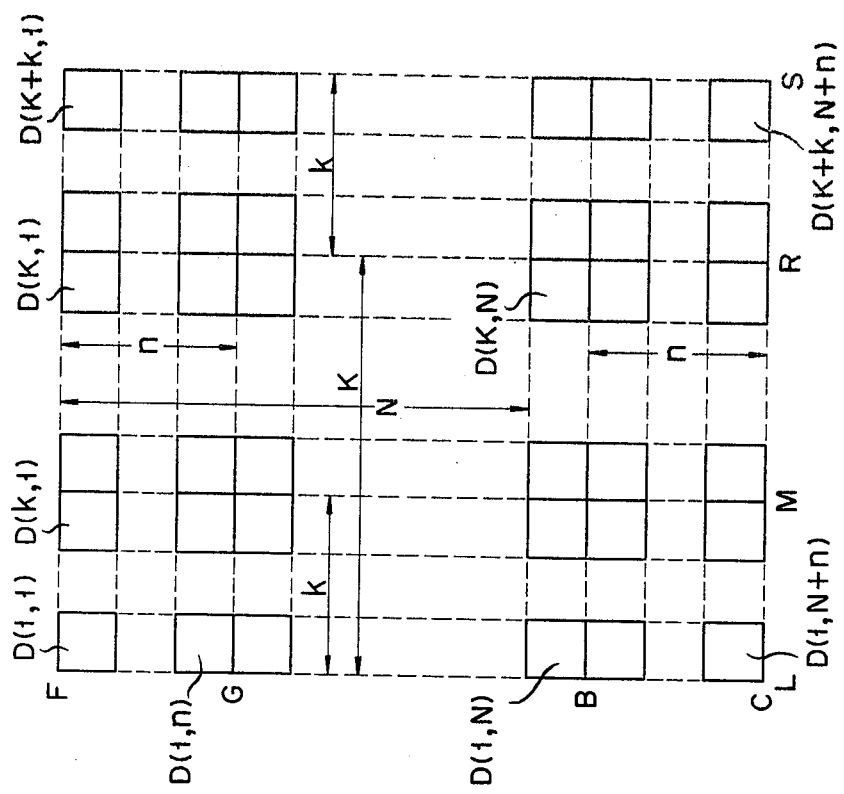
FIG. 2 shows data on the density of composite pattern impressed on the original.

A density signal thus obtained is sampled upon receipt of a timing signal issued in synchronization with the rotation of the reading cylinder. The sampled density signal is subjected to the A-D conversion, providing density data D of FIG. 2 corresponding to the pattern of the original 1 of FIG. 1. The number of the mesh dots of the printing cylinder per circumference is defined by the outer diameter and the screen ruling (the density of the mesh dots). The circumferential number of the mesh dots is equal to the number N of sampling points per scanning line in the FB section of FIG. 1. With the embodiment of this invention, the number n of the sampling points is chosen to be 200. Therefore, a signal denoting the density of the FC section is sampled at sampling points of N+200 per scanning line. The number K of the scanning lines of the LR section is defined, for example, by the width of a main pattern and the screen ruling on the printing cylinder. With the aforementioned embodiment of this invention, the number k of the scanning lines of the RS section is chosen to be 200. Now let it be assumed that density data at an intersection of the Xth line as counted from the left side L of the original 1 and a Yth point as counted from the front side F of the original 1 is represented by D (X, Y) (X and Y are natural numbers, assuming $1 \leq X \leq K+k$ and $1 \leq Y \leq N+n$).

An operation of carrying out the longitudinal density correction is effected by correcting density data corresponding to the section FG from density data corresponding to the extended section BC. Density data of the extended BC section is gradually converted into density data of the corresponding FG section, thereby defining the corrected density data D' of the FG section. Assuming n=200, the density data of the FG section is longitudinally corrected by the following operation:

In case Y is an even number, $$D'(X,Y) = D(X,Y) \times \frac{Y}{200} + D(X, Y+N) \times \frac{(200-Y)}{200}$$

In case Y is an odd number, $$D'(X,Y) = D'(X, Y+1)$$

$$(1 \leq Y \leq 200)$$

The above formulas are used in the operation of a first group. Data D' on the longitudinally corrected density of the GB section is directly derived from original data D on the density of the GB section. Data on the density of the FB section is longitudinally corrected, because little difference arises between the density value of the front side F of the original and that of the backside B thereof.

Density data of the LM section is transversely corrected from the density data of the corresponding extended RS section. Data D" on the transversely corrected density of the LM section is obtained by gradually converting data on the density of the corresponding RS section into data on the density of the LM section.

Assuming k=200, the density data of the LM section is transversely corrected by the following operation:

In case X is an even number, $$D''(X,Y) = D(X,Y) \times \frac{X}{200} + D(X+K,Y) \times \frac{(200-X)}{200}$$

In case X is an odd number, $$D''(X,Y) = D''(X+1,Y)$$

$$(1 \leq X \leq 200)$$

The above formulas are used in the operation of a second group. Data D" on the transversely corrected density of the MR section is directly derived from original data D on the density of the MR section. Data on the density of the LR section is transversely corrected, because no difference appears between the density grade of the left side L of the original and that of the right side R thereof.

Either of the longitudinal and transverse density-correcting operations may be effected ahead of the other. However, proper density correction can be accomplished by carrying out both forms of density correction in succession. As described below, the longitudinal density correction is conducted ahead of the transverse density correction.

Figure 3:
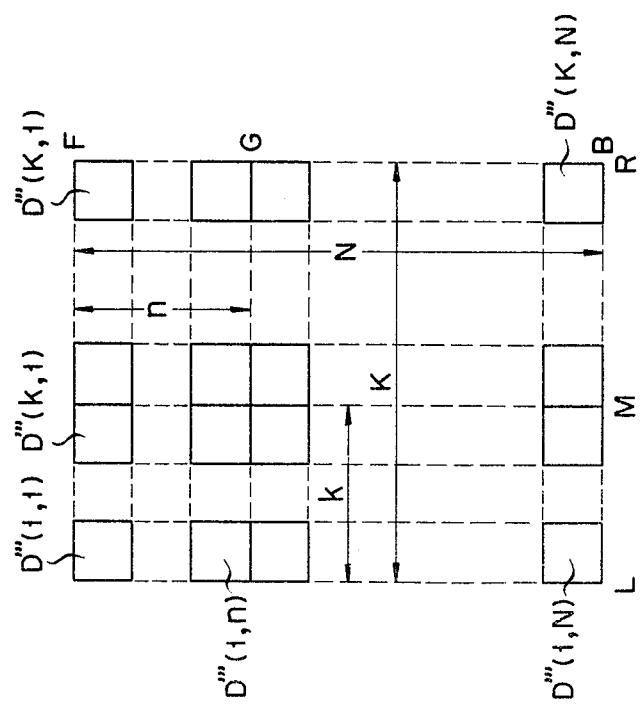
FIG. 3 indicates data on the corrected density of the composite pattern.

Data on the corrected density of the front side, that is, the FG section of the original and data on the corrected density of the left side, that is, the LM section of the original are expressed as D''' (FIG. 3). It is advised to engrave a screened pattern (FIG. 4) on a printing cylinder 50 from the data D''' in such a manner that exact alignment is assured between the front side F and backside B, as well as between the right side R and left side L.

Figure 4:
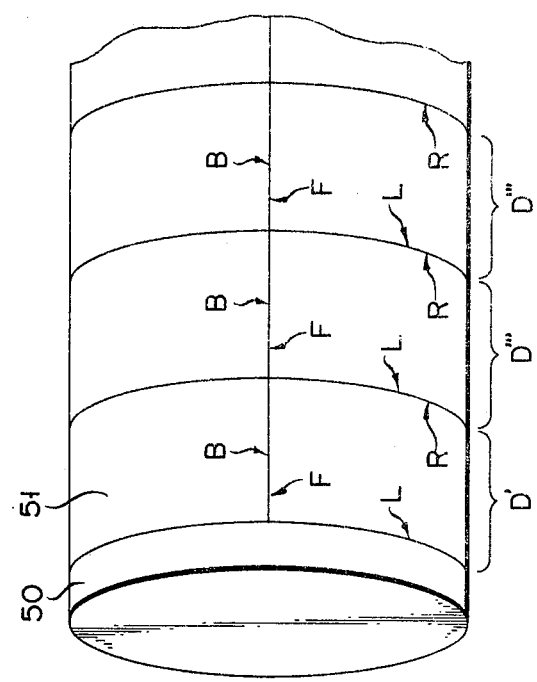
FIG. 4 schematically sets forth a printing cylinder.

Referring to FIG. 4, it is unnecessary to engrave a pattern on the extreme left (first) main pattern section by applying the aforementioned data D''' on the transverse corrected density. With the embodiment of this invention, a pattern is engraved on the first main pattern section by applying only data D' on the longitudinally corrected density, as later described.

Description is now given with reference to FIG. 5 of the operation of an electronic cylinder making apparatus embodying this invention. An original 1 for an endless pattern and multiple pattern is fitted to the peripheral surface of a reading cylinder 11. While the reading cylinder 11 is rotated, a reading head 20 is moved. Reflections from the original 1 is photoelectrically converted by a photoelectric converter of the reading head 20, to provide a density signal. A density signal thus obtained is supplied to an analog-digital (A-D) converter 21, where sampling and 10-bit A-D conversion are carried out.

Serially arranged 10-bit digital density signals thus obtained are conducted to a serial-parallel converter 22 to be converted into parallel digital signals. These parallel digital signals are further converted by a 10-bit-8-bit converter 23 into 8-bit density signals having 256 density grades.

Thereafter, the density signal is supplied to a gradation curve converter 26, where, if necessary, signals carrying out, for example, negative-positive conversion and gradation correction are processed. The processed signals are supplied to a computer. Channel selectors 25, 27 each provided with 1 to 8 channels are interlockingly operated, thereby enabling a plurality of reading heads 20 and a plurality of engraving heads to be actuated in parallel, to simultaneously engrave a plurality of the same patterns repeatedly arranged in a transverse direction on a printing cylinder. The above-mentioned arrangement is already known in the HELIO apparatus, description thereof being omitted.

A density signal delivered through the channel selector 27 is supplied to a central processing unit (CPU) 35 through an input register 30, and an input interface 31. The CPU 35 carries out density correction in order to eliminate density differences occurring at longitudinal and/or transverse seams of adjacent patterns.

The CPU 35 is connected to a keyboard 33. Data on the diameter of a printing cylinder 50, the width of each of multiple patterns and the screen ruling of the printing cylinder 50 are supplied by the keyboard 33. A number N of sampling points per circumference of the printing cylinder 50 and a number K of lines constituting each pattern are computed from the data supplied by the keyboard 33. The counted data is delivered to a computer. The CPU 35 is connected to a memory 34 used for transverse density correction. With the embodiment of this invention, the memory 34 which must have a large capacity is formed of a magnetic disk memory. The memory 34 stores data D' on the longitudinally corrected density of the RS section, data D' on the longitudinally corrected density of the LM section, and data D''' on the longitudinally and transversely corrected density of the LM section.

The CPU 35 causes signals denoting the longitudinally and/or transversely corrected densities to be stored in a core memory 40 for each line through an output interface 36 and output register 37 of the computer. A density signal sent forth from the computer represents an N+n number of density data per line. Consequently, the core memory 40 stores an N+n number of density data per line. Where, however, only an N number of the preceding density data are read out of the core memory 40, then an n number of the succeeding density data which have become unnecessary are deleted.

Density signals stored in the core memory 40 are read out upon receipt of an address signal issued in synchronization with the rotation of the printing cylinder 50. The fetched density signals are converted into analog signals by a D-A converter 42. Thereafter screened patterns are engraved on the printing cylinder 50 by means of an engraving head 43, thereby finally providing a printing cylinder.

Figure 6A:
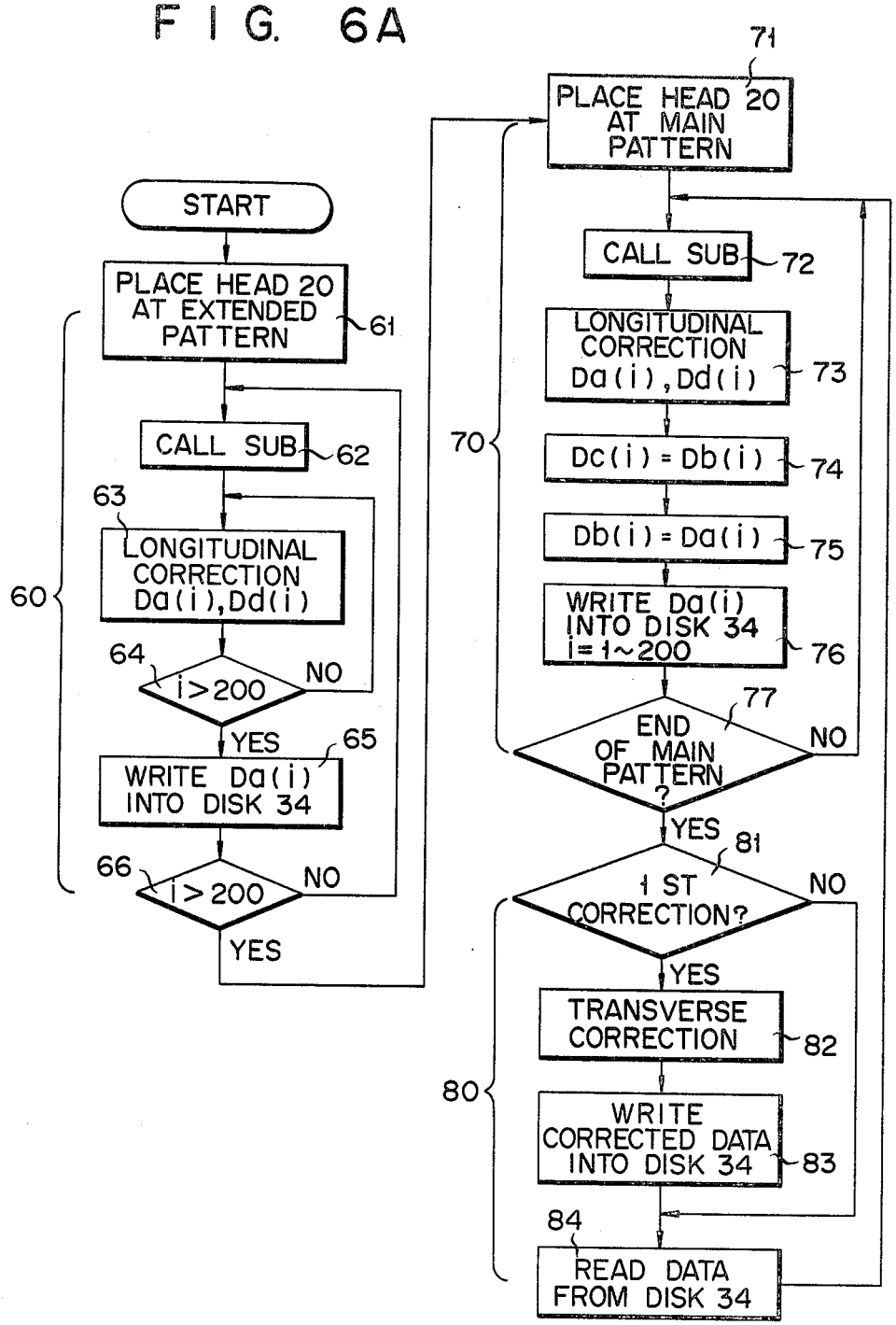
FIGS. 6A and 6B are flow charts showing the operation of the cylinder making apparatus of FIG. 5.
Figure 6B:
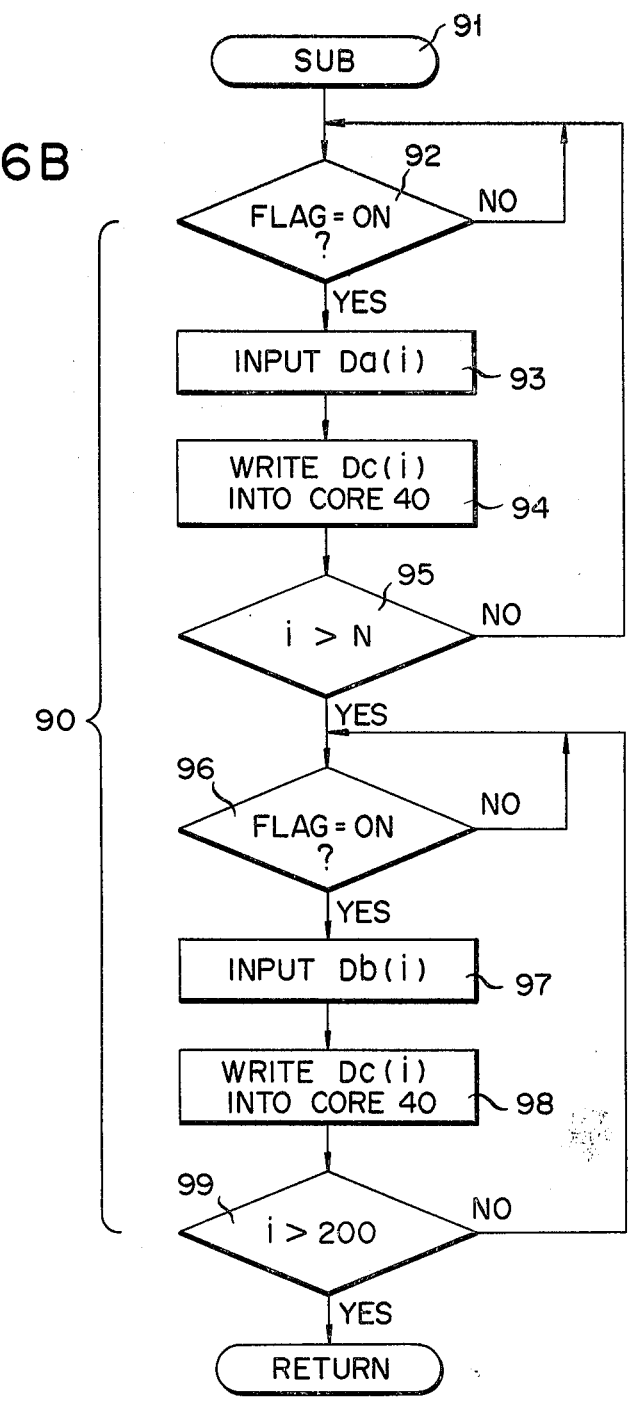

FIG. 6 is a flow chart of the computer used with this invention. The section 60 of the flow chart relates to the steps of previously scanning the RS section of the original for transverse density correction and storing data on the longitudinally corrected density of the RS section into the disk memory 34. The section 70 of the flow sheet relates to a longitudinal density correction, namely, the steps of writing into the core memory 40 per line the density signals obtained by scanning the LR section during the first engraving and of writing into the core memory 40 per line the density signals obtained by scanning the MR section during the subsequent engraving. The section 80 of the flow chart relates to a transversely density correction.

A subprogram 90 relates to the steps of supplying a density signal to the computer and reading the density signal from the computer, that is, supplying the density signal for each line to the computer, and delivering a corrected density signal for each line to the core memory 40.

At step 61 of starting the memorization of transversely extended patterns, the reading head 20 is set on the right side R of the original 1. At step 62, density signals for each line (corresponding to an N+n number of density data) are supplied. At step 63, longitudinal density correction is carried out (for each sampling point). At step 64, judgment is made as to whether an n number (200) of preceding density data for each line have been longitudinally corrected. At step 65, signals denoting corrected densities for each line (corresponding to an N+n number of data) are stored in the disk memory 34. At step 66, the operation is returned to step 62. At step 62, density signals for one line are supplied in the second cycle of operation. Thereafter, the same steps as in the first cycle of operation are repeated for a number k (200) of lines. As a result, data on the longitudinally corrected density of the RS section are stored in the disk memory 34. Step 66 is followed by step 71 of starting the impression of a main pattern as distinguished from the additionally extended patterns. At step 71 of starting the impression, the reading head 20 is placed on the left side L of the original 1. At step 72, density signals for each line are supplied. Signals denoting corrected densities for each line are written in the core memory 40. At step 73, longitudinal density correction is carried out for each line. At steps 74 and 75 data on the longitudinally corrected density are shifted in the data memory of the computer. The shifting of data is for the reason that the timing in which a density signal is issued from the computer is delayed, thereby causing a signal denoting a corrected density to be sent forth at the same time as the supply of a density signal from the computer. The above-mentioned arrangement enables a computer to be additionally provided for the conventional electronic cylinder making apparatus with little modifications. At step 76, signals denoting the densities of a number k (200) of the scanning lines (signals denoting the longitudinally corrected densities of the LM section) are stored in the disk memory 34.

At step 77, judgment is made as to whether the engraving of a main pattern has been completed. Scanning is carried out from the left side L to the right side R of the original 1 to effect longitudinally density correction, therewith engraving a required main pattern 51 on the surface of the printing cylinder 50, and thereby data on the longitudinally corrected density of the LM section is stored in the disk memory 34. As mentioned above, the first engraving of a main pattern on the printing cylinder 50 is completed. Step 77 at which the first impression of the main pattern was completed is followed by step 81. Initially, step 81 is followed by step 82. At step 82, transverse density correction is carried out of data on the longitudinally corrected density of the LM and RS sections which are stored in the disk memory 34. At step 83, data on the longitudinally and transversely corrected density for a number k (200) of lines are stored in the disk memory 34. At step 82, it is possible to successively extinguish signals denoting the density of the LM and RS sections used in the transversely density correction from the disk memory 34, as this correction proceeds.

At step 84, data on the longitudinally and transversely corrected density for a number k (200) of lines are successively read out of the disk memory 34. The read out data are written in the core memory 40 through the computer, thereby effecting the second engraving of the main pattern of the LM section on the printing cylinder 50. When the engraving is brought to an end, the operation is returned to step 72. At this time, the reading head 20 is set on the M side of the original 1. Later, the operation is repeated up to step 77 to scan the MR section and engrave the pattern of the MR section on the printing cylinder 50.

When the pattern engraving up to the right side R of the original is brought to an end (that is, the second engraving of a main pattern is finished), then the operation proceeds from step 77 to step 81. Then the operation jumps from step 81 to step 84. At this step 84, data on the longitudinally and transversely corrected density of the LM section are read out of the disk memory 34, thereby carrying out cylinder-making for a number k (200) of lines.

Later, the same operation as described above (the engraving of the pattern of the MR section by scanning and the engraving of the pattern of the LM section by reading data of the LM section from the disk memory 34) is repeated as often as required, thereby completing the engraving of endless and multiple patterns.

At step 92 of the subprogram 90, an input flag signal supplied from the HELIO apparatus is checked. At step 93, one data is stored in a data memory Da. At step 94, one data is fetched from the data memory Dc to the core memory 40. Then the operation proceeds to step 95. The above-mentioned cycle of operation is repeated to cause an N number of the preceding data of each line on the density of the FB section to be stored in the data memory Da, and also an N number of data on the corrected density of the FB section to be fetched from the data memory Dc to the core memory 40. At the succeeding step 96, a cycle of operation extending from the step 96 to step 99 is repeated for an n number (200) of times, causing an n number of data corresponding to the BC section extended for longitudinal density correction to be stored in a data memory Db, and also an n number of data to be fetched from the data memory Dc to the core memory 40.

The foregoing description relates to an electronic cylinder making method embodying this invention. It will be noted, however, that the invention is not limited by the embodiment. Obviously, the invention can be practiced with various changes and modifications. These changes and modifications should be considered to be included in the invention.

Description was given of a supplementary pattern additionally extended from the backened of an original to effect, for example, longitudinal density correction. However, such supplementary pattern may be extended from the front end of the original. Further, a supplementary pattern which was extended from the right end of the original for transverse density correction may be extended from the left end of the original. The width of these extended supplementary patterns was chosen to be about 3 cm. However, the width may be made wider or narrower. The aforesaid numbers n and k were defined to be 200 alike, but may be changed. The density correction formulas need not be limited to the first and second groups. The above-described embodiment relates to the case where a density-correcting computer was additionally provided for the HELIO apparatus. However, this invention may be applied to any other type of electronic cylinder making apparatus. It is also possible to originally design an electronic cylinder making apparatus allowing for longitudinal and/or transverse density correction. A large capacity memory such as a disk memory 34 used in the aforesaid embodiment is expensive. If, therefore, for example, two reading heads are provided to simultaneously scan the LM and RS sections, then longitudinally density correction is made possible even without the disk memory 34. Further, if a large capacity memory can be manufactured at low cost, then it is possible to provide an electronic process apparatus to which simplified software and arrangement can be applied, by causing all data shown in FIGS. 2 and 3 to be stored in such memory. Further, it is not necessary to let a single apparatus undertake both data reading and processing. It is possible to store density data, for example, in a magnetic tape, and provide separate apparatuses for data reading and processing.

A cylinder making apparatus embodying this invention which is arranged as described above offers the undermentioned prominent practical advantages. With the conventional apparatus, it often happens that where fine density differences occur between the front end and backened portions of an original as well as between the right and left end portions thereof, then process errors are discovered only after trial printing is undertaken. In such case, a great deal of time and cost were consumed in correcting an original, or a produced printing cylinder or remaking the original. However, the cylinder making method of this invention can eliminate the difficulties encountered in the conventional method. Since an original is prepared by photographing endless and multiple patterns, for example, in the grains of timbers or marble slabs whose front end is not continuous to the backend and rearranging the patterns in such a manner that patterns having substantially the same density which appear on the front and back sides of the original as well as on the right and left sides thereof are contiguously set, it is difficult to form an original whose front end and backend portions have the same density and whose right side and left side portions have the same pattern. However, the cylinder making method of the invention can renderless visible differences between the densities of the seams appearing on a printed web, as well as differences between the densities of the seams appearing on the printed web even if the density differences appearing on an original are relatively noticeable. Consequently the cylinder making method of the invention prominently alleviates the conditions under which an original should be prepared.

The prior art cylinder making method had the drawbacks that where an original was expanded or contracted by changes in ambient temperature and humidity as well as in the tension with which an original was stretched over the surface of a printing cylinder, then the front and back end portions of adjacent patterns, as well as the right and left end portions of thereof were slightly displaced from each other, resulting in the appearance of streakes at the joints of the respective patterns. However, the cylinder making method of this invention eliminates such difficulties as were encountered in the prior art.

A novel electronic cylinder making apparatus embodying this invention is manufactured by assembling a computer with the prior art apparatus. Therefore, the present apparatus is not so expensive as the conventional type. An original bearing a pattern slightly extended from that which is used with the prior art method has only to be provided. Therefore, the cost of the cylinder making apparatus of this invention does not prominently increase over that of the prior art type.

What is claimed is:

1. An electronic cylinder making method for an endless pattern and/or a multiple pattern which comprises the steps of:

scanning an original on which a main pattern extended at a portion to be continued in a required degree is impressed, thereby producing a density signal;

carrying out an analog-digital conversion of the density signal, thereby providing digital data on the density of the original;

correcting the digital density data obtained by gradually converting data on the density of the extended pattern section into data on the density of the opposite pattern section to the extended pattern section; and engraving a screened pattern on the surface of a printing cylinder in accordance with the contents of a signal denoting the corrected density.

2. The electronic cylinder making method according to claim 1, wherein a screened pattern which is engraved on the extreme left side of the printing cylinder is drawn from data on the density which is not transversely corrected.

3. The electronic cylinder making method according to claim 1 or 2, wherein data on the transversely corrected density is stored in a memory; and a pattern of that section of the original whose density is transversely corrected is engraved on the surface of the printing cylinder in accordance with the contents of data on the transversely corrected density which is read out of the memory.

4. An electronic cylinder making apparatus scanning an original to produce a density signal, converting the density signal into the digital form to provide digital density data, engraving a screened pattern on a printing cylinder in accordance with the contents of the digital density data, which comprises:

a scanning section for reading out data on the density of that section of an extended section as well as a main pattern of the original; and a computer for correcting a signal denoting the density of the opposite pattern section corresponding to the extended pattern section in accordance with the contents of data on the density of the extend pattern section 5. The electronic cylinder making apparatus according to claim 4, wherein said computer gradually converts data on the density of the extended pattern section for the respective scanning lines into data on the density of the opposite pattern section to the extended pattern section.

6. The electronic cylinder making apparatus according to claim 4, wherein said computer gradually converts data on the density of the transversely extended pattern section into data on the density of the opposite pattern section to the transversely extended pattern section.

7. The electronic cylinder making apparatus according to claim 4, wherein the computer gradually converts data on the density of extended pattern sections into data on the density of the opposite pattern section to the extended section both of longitudinally and transversely.

8. An electronic cylinder making apparatus for an endless pattern and/or a multiple pattern which comprises:

a reading cylinder and head for scanning an original thereby to produce a density signal;

an analog-digital converter for converting the density signal into a digital signal;

a computer for carrying out the longitudinal and/or transverse correction of the density data by gradually converting data on the density of the extended pattern section into data on the density of the opposite pattern section to the extended pattern section;

a digital-analog converter for converting data on the density corrected by said computer into an analog signal; and a recording head for engraving a screened pattern in the surface of the printing cylinder in accordance with the contents of a density signal delivered from the D-A converter.

9. The electronic cylinder making apparatus according to claim 8, which further comprises a memory which is set in the computer to store data on the density of a pattern of a section extended transversely of the original.

10. The electronic cylinder making apparatus for an endless pattern and/or a multiple pattern which comprises:

means for scanning the original thereby to produce a density signal;

means for converting a density signal into a digital signal;

a computer for carrying out the longitudinally and/or transversely correction of the digital density signal and issuing an output signal denoting the corrected density in synchronization with the supply of an input signal;

means for converting a signal denoting the corrected density which is delivered from the computer into an analog signal; and means for engraving a screened pattern on a printing cylinder in accordance with the contents of a density signal converted into an analog signal.

11. The electronic cylinder making apparatus according to claim 10, wherein the original comprises an endless pattern about 3 cm long which are continuously set longitudinally, and/or a multiple pattern about 3 cm long which spatially extend transversely.

12. The electronic cylinder making apparatus according to claim 10, wherein the printing cylinder is engraved with a pattern whose respective seams have such a density as is realized by gradually converting the density of the extended pattern section of the original into that of the opposite pattern section thereof.

* * * * *